Jan. 23, 1951  H. M. MAYNARD  2,538,789
SEQUENCE CONTROL CIRCUIT
Filed Sept. 1, 1948
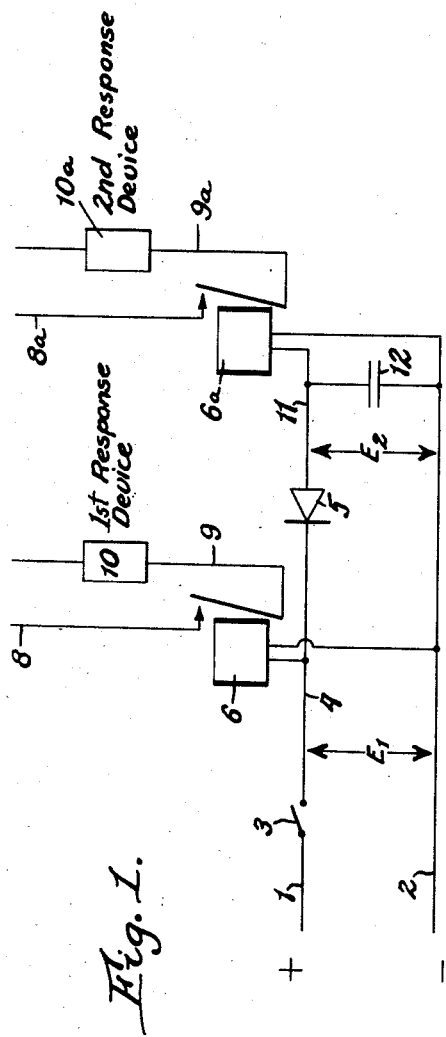
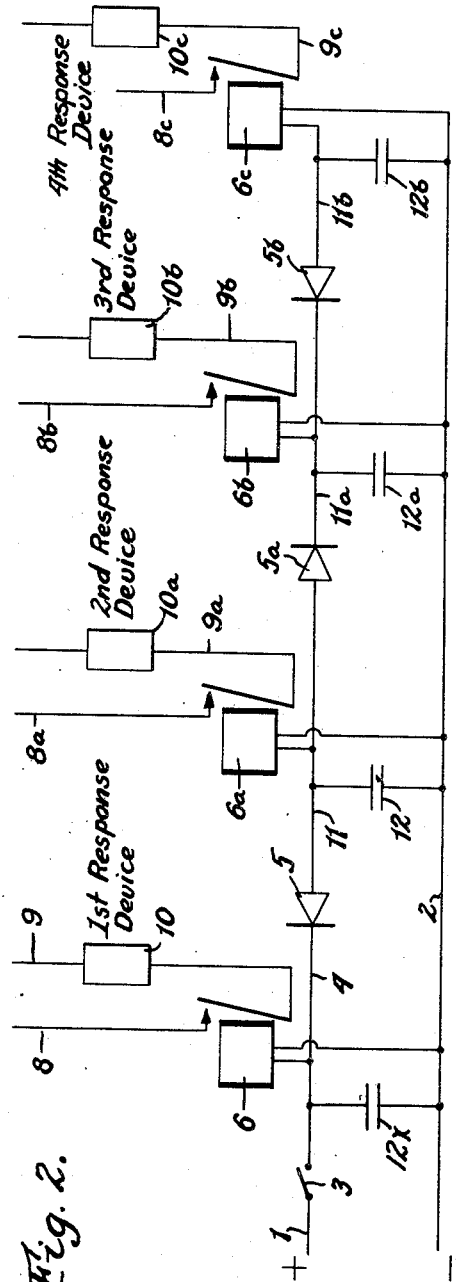
INVENTOR.
Hamilton M. Maynard
BY Popp and Popp
Attorneys.

Patented Jan. 23, 1951

2,538,789

UNITED STATES PATENT OFFICE 2,538,789

SEQUENCE CONTROL CIRCUIT

Hamilton M. Maynard, Buffalo, N. Y., assignor, by mesne assignments, to International Business Machines Corporation, New York, N. Y., a corporation of New York Application September 1, 1948, Serial No. 47,200

6 Claims. (Cl. 175—320)

This invention relates to a sequence control circuit for the automatic successive operation of a series of electrically responsive devices.

One of the principal objects of the invention is to provide such a circuit which insures the positive successive operation of a series of such devices.

Another object is to provide such a circuit in which any succeeding such device cannot be operated until its preceding device has completed its operation.

Another object is to provide such a sequence control circuit which controls the sequence of operation of the electrically responsive device by means which are entirely electrical and do not involve the movement of mechanical parts, although the electrically responsive device controlled by the circuit can involve or effect the movement of a mechanical part if, for example, such device is a relay or solenoid.

Another object is to provide such a sequence control circuit which is rapid in its operation thereby to permit of its use in conjunction with electrically responsive devices actuated in high speed succession.

Another object is to provide such a sequence control circuit which is composed of simple and rugged components which are not likely to get out of order under conditions of severe and constant use.

Other objects and advantages will appear from the following description and drawings in which Fig. 1 is a diagrammatic representation of a sequence control circuit embodying the present invention and shown as operating two electrically responsive devices.

Fig. 2 is a view similar to Fig. 1 and showing the sequence control circuit as operating more than two electrically responsive devices, four electrically responsive devices being shown.

Generally, the invention contemplates the arrangement of an inductor, an electrically responsive device and a rectifier so that the de-energization of said inductor operates to energize the electrically responsive device. Any desired number of such groups of these components can be arranged in electrical tandem so as to effect the successive operation of the electrically responsive devices.

In the sequence control circuit shown in Fig. 1, the numeral 1 represents the positive side of a direct current supply line and the numeral 2 the negative side thereof. A switch 3, which can be manually or automatically operable, connects the positive side 1 of the supply line with a line 4 connecting with the rectifier 5. The winding of a relay 6 is connected across the lines 2 and 4 and the armature and fixed contact of this relay are shown as arranged to open and close a circuit through lines 8 and 9 which actuate a first response device 10 such as a key punch, said relay and response device 10 thereby jointly forming an electrically responsive device.

The other side of the rectifier 5 is shown as connected by a line 11 with one end of the winding of a second relay 6a, the other end of this winding being connected with the negative side 2 of the supply line. The armature and fixed contact of this second relay 6a are shown as arranged to open and close a circuit through lines 8a and 9a which actuate a second response device 10a such as a stepping switch, which is not to be actuated until the first response device 10 operated by the relay 6 has completed its operation. The relay 6a and response device 10a thereby constitutes a second electrically responsive device.

The rectifier 5 can be of any type, such as a selenium, copper oxide or vacuum tube rectifier, and is arranged in the relation shown to permit flow of current from the line 11 to the line 4 but to effectively prevent a reverse flow of current, it being assumed that the current flow is from positive to negative.

A condenser 12 can be arranged across the lines 11 and 2 to reduce the peak voltage applied to the winding of the relay 6a.

In the operation of the sequence control circuit. when the switch 3 is closed, a supply potential $E_1$ is applied across the winding of the relay 6 to close this relay but this potential is not impressed across the lines 11 and 2 because the rectifier 5 effectively prevents the flow of current from the positive side 1 of the supply line to the line 11. Accordingly, the relay 6 is closed to actuate the first response device 1a but as no effective potential is impressed across the winding of the second relay 6a, this relay is not energized and the second response device 10a is not actuated.

When the switch 3 is opened the line potential $E_1$ across the winding of the relay 6 is cut off and hence this relay is de-energized to open the circuit through the first response device 10. However, the collapse of the field of the winding of this first relay 6 at this time creates a counter-electromotive force or a discharge voltage $E_2$ across the lines 4 and 2 of a polarity reversed from that of the original voltage $E_1$ and the flow of current induced by this counter-electromotive force $E_2$ is not impeded by the rectifier 5. Accordingly, the discharge voltage $E_2$ from the winding of the first relay 6 impresses a potential across the winding of the second relay 6a and this relay is energized for an instant. This energization actuates the second response device 10a in circuit with the armature and fixed contact of this second relay 6a and hence this second response device 10a is rendered operative through energy derived from rendering the first electrically responsive device inoperative. It will be seen that operation of the two response devices 10 and 10a in succession is positively provided.

It will be understood that any desired number of electrically responsive devices can be operatively included in the sequence control circuit taught by the present invention. Thus a greater number of electrically responsive devices to be operated in succession in accordance with the present invention is illustrated by the four such devices shown in Fig. 2.

In the circuit shown in Fig. 2, the circuit for the first and second electrically responsive devices is identical to that shown in Fig. 1 and hence the same reference characters are employed. For the third electrically responsive device, a rectifier 5a is interposed between the line 11 and a line 11a connecting with a rectifier 5b. The winding of a relay 6b is connected across the lines 11a and 2 and the armature and fixed contact of this relay 6b are shown as arranged to open and close a circuit through the lines 8b and 9b which actuate a third response device 10b.

The other side of the rectifier 5b is shown as connected by a line 11b with one end of the winding of a relay 6c, the other end of this winding being connected with the negative side 2 of the supply line. The armature and fixed contact of this relay 6c are shown as arranged to open and close a circuit through lines 8c and 9c which actuate a fourth responsive device 10c.

It will be noted that the rectifier 5a is in reverse relation to the rectifier 5 and that the rectifier 5b is in reverse relation to the rectifier 5a.

The operation of the first and second electrically responsive devices is identical with that described with reference to Fig. 1 and hence this description is not repeated. As previously indicated, the relay 6a is energized only for an instant by the counter-electromotive force developed by de-energization of the relay 6. The current developed by this counter-electromotive force from the relay 6, while of proper polarity to pass through the winding of and energize the relay 6a, cannot pass through the winding of the relay 6b because of the reversed relation of the rectifier 5a to the rectifier 5. Nor can this current pass through the winding of the relay 6c because it is blocked by the rectifier 5a also. Further, the potential of the polarity indicated, initially impressed on the circuit on closing the switch 3 does not energize any of the relays 6a, 6b or 6c because of the blocking effect of the rectifiers 5 and 5b.

As previously described, the counter-electromotive force established on de-energization of the relay 6 establishes a current which momentarily energizes the relay 6a, this current being of a polarity to pass the rectifier 5. On de-energization of the relay 6a, its counter-electromotive force provides a current passing from the winding of the relay 6a, through rectifier 5a, winding of relay 6b and through the line 2 back to the winding of relay 6a. This momentarily energizes this relay 6b to pull up its armature and operate the third response device 10b. However, this current flow does not energize the relay 6c to operate its associated or fourth response device 10c as the polarity of this current is in opposition to the rectifier 5b.

After the momentary energization of the relay 6b, the counter-electromotive force generated by the winding of this relay energizes the winding of the relay 6c, this current being of a polarity to pass the rectifier 5b. Accordingly the fourth electrically responsive device is operated. As with the form of the invention shown in Fig. 1, condensers 12a and 12b can be placed across the windings of the relays 6b and 6c, respectively, to reduce the peak voltage. To insure against re-energization of the winding of the relay 6 by the counter electromotive force generated by the winding of the relay 6a, a similar condenser 12x can be placed across the winding of the relay 6 by connection to the lines 4 and 2.

It will therefore be seen that the form of the invention shown in Fig. 2, the four response devices 10, 10a, 10b and 10c are successively operated, each such device, following the first, being actuated by the counter electromotive force developed on the de-energization of the inductor in the preceding electrically responsive device. It is obvious, of course, that succeeding inductors have progressively less inductance.

It will be seen that in both forms of the invention the inductor generating the counter-electromotive force for the operation of the next succeeding electrically responsive device does not have to be in the form of a relay as shown and that the last electrically responsive device does not have to include an inductor since there is no need to develop a counter-electromotive force upon de-energization of this last electrically responsive device.

From the foregoing it will be seen that the present invention provides a sequence control circuit which is free from mechanically moving parts and which insures the positive successive operation of a series of electrically responsive devices and is particularly applicable where high speed successive operations are desired.

I claim:

1. A sequence control circuit, comprising an inductive winding, means operatively arranged to connect and disconnect said winding across a source of direct current, and a closed series circuit including said winding, a normally de-energized electrically responsive device and a rectifier, said rectifier being arranged to permit the flow of current through said winding in said closed series circuit substantially only in the same direction as the direct current flows through said winding when connected across said source, whereby upon operation of said means to disconnect said winding from across said source the counter electromotive force of said winding induces a current to flow through said closed series circuit thereby to operate said electrically responsive device.

2. A sequence control circuit, comprising an inductive winding, means operatively arranged to connect and disconnect said winding across a source of direct current, an electrically responsive device to be energized upon de-energization of said winding, a rectifier in series with said electrically responsive device and both connected in a secondary circuit across said winding, and said rectifier being arranged to oppose the flow of current from said source through said secondary circuit, whereby upon operation of said means to disconnect said winding from across said source the counter electromotive force of said winding induces a current to flow through said secondary circuit thereby to operate said electrically responsive device.

3. A sequence control circuit, comprising a first electrically responsive device including a relay having a winding, means operatively arranged to connect and disconnect said winding across a source of direct current, a second electrically responsive device to be energized upon de-energization of said winding, a rectifier in series with said second electrically responsive device and both connected in a secondary circuit across said winding, and said rectifier being arranged to oppose the flow of current from said source through said secondary circuit, whereby upon operation of said means to disconnect said winding from across said source the counter electromotive force of said winding induces a current to flow through said secondary circuit thereby to operate said second electrically responsive device.

4. A sequence control circuit, comprising a first electrically responsive device including a first relay having a first winding, means operatively arranged to connect and disconnect said first winding across a source of direct current, a second electrically responsive device to be energized upon de-energization of said first winding and including a second relay having a second winding, a rectifier in series with said second winding and both connected in a secondary circuit across said first winding, and said rectifier being arranged to oppose the flow of current from said source through said secondary circuit, whereby upon operation of said means to disconnect said first winding from across said source the counter electromotive force of said first winding induces a current to flow through said secondary circuit thereby to operate said second electrically responsive device.

5. A sequence control circuit, comprising a first electrically responsive device including a first relay having a first winding, means operatively arranged to connect and disconnect said first winding across a source of direct current, a second electrically responsive device to be energized upon deenergization of said first winding and including a second relay having a second winding, a first rectifier in series with said second winding and both connected in a secondary circuit across said first winding, said first rectifier being arranged to oppose the flow of current from said source through said secondary circuit, a third electrically responsive device to be energized upon de-energization of said second winding and including a third relay having a third winding, a second rectifier in series with said third winding and both connected in a tertiary circuit across said second winding, and said second rectifier being arranged to oppose the flow of current from said secondary circuit through said tertiary circuit, whereby upon operation of said means to disconnect said first winding from across said source the counter electromotive force of said first winding induces a current to flow through said secondary circuit thereby to operate said second relay only and the counter electromotive force of said second winding induces a current to flow through said tertiary circuit thereby to operate said third relay only.

6. A sequence control circuit, comprising a plurality of relays to be energized successively and each having a winding, means operatively arranged to connect and disconnect the winding of the first relay to be energized across a source of direct current, the windings of each successive pair of relays being arranged in a closed series circuit to provide a parallel like circuit arrangement of all of said windings, a rectifier arranged in series with the pair of windings in each of such successively arranged closed series circuits to oppose the flow of current in its respective closed series circuit from the next preceding closed series circuit, whereby upon operation of said means to disconnect the winding of said first relay from across said source the counter electromotive force of each of said windings successively, starting with the winding of said first relay, induces a current to flow through the particular closed series circuit of which the winding generating the counter electromotive force is the first to be energized thereby to operate said relays singly and successively.

HAMILTON M. MAYNARD.

REFERENCES CITED

The following references are of record in the file of this patent:

UNITED STATES PATENTS

| Number | Name | Date |
|---|---|---|
| 1,453,555 | Stack | May 1, 1923 |
| 1,661,651 | Bossart | Mar. 6, 1928 |
| 1,787,550 | Sorensen | Jan. 6, 1931 |
| 1,901,628 | Brainard | Mar. 14, 1933 |
| 1,928,812 | Dawson | Oct. 3, 1933 |
| 1,966,077 | Nyman | July 10, 1934 |
| 2,008,399 | Marshall | July 16, 1935 |
| 2,155,229 | Hoffmann | Apr. 18, 1939 |
| 2,393,060 | Reagan | Jan. 15, 1946 |